United States Patent
Yamamoto (10) Patent No.: US 10,590,873 B2
(45) Date of Patent: Mar. 17, 2020

(54) CONTROL DEVICE FOR INTERNAL COMBUSTION ENGINE

(71) Applicant: Mitsubishi Heavy Industries, Ltd., Tokyo (JP)

(72) Inventor: Takayuki Yamamoto, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 14/914,250

(22) PCT Filed: Oct. 7, 2014

(86) PCT No.: PCT/JP2014/076794
§ 371 (c)(1),
(2) Date: Feb. 24, 2016

(87) PCT Pub. No.: WO2015/053260
PCT Pub. Date: Apr. 16, 2015

(65) Prior Publication Data
US 2016/0215716 A1    Jul. 28, 2016

(30) Foreign Application Priority Data

Oct. 9, 2013   (JP) .................................. 2013-211973

(51) Int. Cl.
*F02D 41/00* (2006.01)
*F02M 26/47* (2016.01)
(Continued)

(52) U.S. Cl.
CPC ..... *F02D 41/0077* (2013.01); *F02D 41/0052* (2013.01); *F02M 26/20* (2016.02);
(Continued)

(58) Field of Classification Search
CPC ............. F02D 41/0077; F02D 41/1441; F02D 41/0052; F02D 41/005; F02D 41/1458;
(Continued)

(56) References Cited

U.S. PATENT DOCUMENTS 4,440,140 A * 4/1984 Kawagoe ............ F02D 41/0077
123/568.27
5,755,212 A * 5/1998 Ajima ................. F02D 41/1405
123/674
(Continued)

FOREIGN PATENT DOCUMENTS

DE    102008044269 A1 *  6/2010    ......... F02D 41/0072
JP         57200659 A      8/1982
(Continued)

OTHER PUBLICATIONS

Winge Vigild Christian DE102008044269 Machine Translation.*
(Continued)

*Primary Examiner* — Hung Q Nguyen
*Assistant Examiner* — Brian P Monahon
(74) *Attorney, Agent, or Firm* — Berkeley Law & Technology Group, LLP (57) ABSTRACT

An object is to provide a control device for an internal combustion engine, at an inexpensive price, whereby it is possible to suppress a decrease in the exhaust gas performance of the internal combustion engine due to an environmental change or damage from aging. The present invention relates to a control device for an internal combustion engine which controls an EGR amount by adjusting an opening degree of an EGR valve (20) disposed in an EGR channel (16), the control device comprising temperature detection units (24, 26, 30), a pressure detection unit (28), a unit (48) to calculate a basic opening degree of the EGR valve, a unit (44, 56) to calculate an estimate value of at least one of an
(Continued)

air-excess ratio or an intake oxygen concentration on the basis of detection values obtained by the temperature detection units and the pressure detection unit, a unit (46, 48) to calculate a target value of the estimate value, a unit (50) to calculate a correction factor K on the basis of the estimate air-excess ratio λs and the target air-excess ratio λt, a unit (52) to calculate the opening-degree command value D for the EGR valve on the basis of the basic opening degree Db and the correction coefficient K, and a unit (54) to control the EGR valve on the basis of the opening-degree command value D.

5 Claims, 10 Drawing Sheets

(51) Int. Cl.
  *F02M 26/20* (2016.01)
  *F02M 26/21* (2016.01)
  *F02M 26/53* (2016.01)
(52) U.S. Cl.
  CPC ............ *F02M 26/21* (2016.02); *F02M 26/47* (2016.02); *F02M 26/53* (2016.02)
(58) Field of Classification Search
  CPC ............... F02D 41/0072; F02D 41/045; F02D 2200/0414; F02D 2041/141; F02D 2041/0067; F02D 2021/083; F02M 26/21; F02M 26/53; F02M 26/20; F02M 26/47; Y02T 10/47
  See application file for complete search history.

(56) References Cited

U.S. PATENT DOCUMENTS

| | | | | |
|---|---|---|---|---|
| 5,771,688 | A * | 6/1998 | Hasegawa | F02D 41/1441 123/676 |
| 6,176,224 | B1 * | 1/2001 | Wu | F02D 19/023 123/527 |
| 6,338,245 | B1 * | 1/2002 | Shimoda | F02B 1/12 60/278 |
| 6,347,519 | B1 | 2/2002 | Kreso | |
| 6,378,508 | B1 * | 4/2002 | Braun | F02D 41/0072 123/568.12 |
| 6,415,776 | B1 | 7/2002 | Gates et al. | |
| 6,474,293 | B1 * | 11/2002 | Bauer | F02D 41/3064 123/295 |
| 2002/0011068 | A1 * | 1/2002 | Kako | F01N 11/007 60/285 |
| 2003/0041845 | A1 * | 3/2003 | Akao | F02D 41/0072 123/568.16 |
| 2003/0114978 | A1 * | 6/2003 | Rimnac | F02B 29/0418 701/108 |
| 2003/0136390 | A1 * | 7/2003 | Ramamurthy | F02D 41/005 123/568.22 |
| 2004/0061290 | A1 * | 4/2004 | Gray, Jr. | F01N 3/035 277/411 |
| 2005/0229909 | A1 * | 10/2005 | Nakazawa | F02D 13/0261 123/568.14 |
| 2006/0011180 | A1 * | 1/2006 | Sasaki | F01N 3/0814 123/698 |
| 2006/0069494 | A1 * | 3/2006 | Yamada | F02D 41/0072 701/108 |
| 2006/0117737 | A1 * | 6/2006 | Ohsaki | F02D 41/0072 60/276 |
| 2008/0216557 | A1 * | 9/2008 | Wang | F02D 35/025 73/23.31 |
| 2009/0024305 | A1 * | 1/2009 | Ishikawa | F02D 41/0057 701/103 |
| 2009/0064967 | A1 * | 3/2009 | Shikawa | F02D 13/0226 123/345 |
| 2011/0088674 | A1 * | 4/2011 | Shutty | F02D 41/0007 123/568.21 |
| 2011/0313634 | A1 * | 12/2011 | Yasui | F02D 41/0047 701/102 |
| 2011/0315101 | A1 * | 12/2011 | Cleary | F02D 13/0207 123/90.15 |
| 2012/0031374 | A1 * | 2/2012 | Hokuto | F02D 35/027 123/445 |
| 2012/0085318 | A1 * | 4/2012 | Okazaki | F02D 11/105 123/350 |
| 2012/0097126 | A1 * | 4/2012 | Kumano | F02D 13/0219 123/294 |
| 2013/0024085 | A1 * | 1/2013 | Wang | F02D 41/18 701/102 |
| 2013/0024091 | A1 * | 1/2013 | Yun | F02D 41/0057 701/103 |
| 2013/0074492 | A1 * | 3/2013 | Chi | F02B 37/18 60/602 |
| 2013/0192569 | A1 * | 8/2013 | Seiberlich | F02D 41/0072 123/568.26 |

FOREIGN PATENT DOCUMENTS

| | | |
|---|---|---|
| JP | 2003155957 A | 5/2003 |
| JP | 2007285179 A | 11/2007 |
| JP | 2009270518 A | 11/2009 |
| JP | 2013170520 A | 9/2013 |
| WO | 2010029800 A | 3/2010 |
| WO | 2013065186 A1 | 5/2013 |
| WO | 2015053260 A1 | 4/2015 |

OTHER PUBLICATIONS

International Search Report, International Patent Application No. PCT/JP2014/076794, dated Jan. 20, 2015, 12 pgs.
European Search Report, App. No. 14852643.7, dated Jul. 28, 2016, 11 Pages.
Research Disclosure, Titled: EGR Rate Measurement Using Temperatures, 2244 Research Disclosure, No. 352, Emsworth GB, Aug. 1993.
Notification of Transmittal of Translation of the International Preliminary Report on Patentability,Japanese Patent Application No. PCT/JP2014/076794, dated Apr. 21, 2016, 19 pgs.
International Search Report, Japanese Patent Application No. PCT/JP2014/076794, dated Jan. 20, 2015, 12 pgs.
Notification Concerning Submission, Obtention or Transmittal of Priority Document, App. No. PCT/JP2014/076794, Filed Oct. 7, 2014. dated Nov. 25, 2014, 1 pg.
Notification of the Recording of a Change, App No. PCT/JP2014/076794, Filed Oct. 7, 2014. dated Jun. 1, 2015, 1 pg.
Office Action, EP App. No. 14852643.7, dated Aug. 1, 2017, 7 Pages.
Office Action, JP App. No. 2013-211973, Drafted Jul. 31, 2017, dated Aug. 4, 2017, 3 Pages.

\* cited by examiner

DARK: EGR-VALVE BASIC OPENING DEGREE IS LARGE
LIGHT: EGR-VALVE BASIC OPENING DEGREE IS SMALL

FIG. 4

DARK: TARGET AIR-EXCESS RATIO IS LOW
LIGHT: TARGET AIR-EXCESS RATIO IS HIGH

DARK: TARGET INTAKE OXYGEN CONCENTRATION IS LOW
LIGHT: TARGET INTAKE OXYGEN CONCENTRATION IS HIGH

CONTROL DEVICE FOR INTERNAL COMBUSTION ENGINE

TECHNICAL FIELD

The present invention relates to a control device for an internal combustion engine including an exhaust-gas recirculation device (EGR) for recirculating a part of exhaust gas to an intake channel.

BACKGROUND ART

A known internal combustion engine includes an exhaust-gas recirculation device (EGR) for recirculating a part of exhaust gas of the internal combustion engine to an intake channel. In such an internal combustion engine, especially in a diesel engine, when a change in the driving state increases an EGR circulation amount, more smoke (PM) may be produced due to an insufficient intake flow rate. Further, a decrease in the EGR circulation amount may lead to loss of the NOx reduction effect. In view of this, to reduce the discharge amount of PM and NOx contained in exhaust gas, it is required to control the EGR circulation amount suitably in accordance with driving conditions.

Patent Documents 1 and 2 disclose an example of a control for an EGR device of such type.

Patent Document 1 discloses controlling the opening degree of an EGR valve by calculating an air-excess ratio in a cylinder from a fuel-injection amount, an intake-air amount, and a non-combusted air amount in EGR gas returned to an intake system, and obtaining an opening-degree target value for the EGR valve on the basis of the air-excess ratio.

Patent Document 2 discloses controlling the opening degree of an EGR valve using a control parameter which is an EGR rate calculated as a ratio of exhaust gas to intake air of an internal combustion engine on the basis of a detection value of a temperature sensor.

CITATION LIST

Patent Literature

Patent Document 1: JP2009-270518A
Patent Document 2: JP2003-155957A

SUMMARY

Problems to be Solved

In Patent Document 1, the air-excess ratio, which is a control parameter, is calculated using a detection value of an airflow sensor. In other words, an airflow sensor needs to be additionally provided to control the opening degree of the EGR valve, which leads to an increase in the cost.

In Patent Document 2, the EGR rate is selected as a control parameter to control the opening degree on the premise that there is no small correlation between the EGR rate and the discharge amount of PM and NOx contained in the exhaust gas. However, the strength of the correlation is variable in accordance with the operation state of the internal combustion engine and thus not constant. Thus, with the opening-degree control using the EGR rate as a control parameter, the discharge amount of PM and NOx contained in exhaust gas may not be sufficiently reduced depending on the operation state of the internal combustion engine.

In view of this, the present invention was made, and an object of the present invention is to provide a control device for an internal combustion engine, at an inexpensive price, whereby it is possible to suppress a decrease in the exhaust gas performance of the internal combustion engine at low cost.

Solution to the Problems

To achieve the above object, according to one embodiment of the present invention, a control device for an internal combustion engine with an EGR device which recirculates a part of exhaust gas of the internal combustion engine to an intake channel via an exhaust gas recirculation (EGR) channel, the internal combustion engine being configured to control an EGR amount by adjusting an opening degree of an EGR valve disposed in the EGR channel, comprises: a first temperature detection unit disposed in the intake channel and on an upstream side of a merging part at which the intake channel merges with the EGR channel; a second temperature detection unit disposed in the intake channel and on a downstream side of the merging part; a third temperature detection unit disposed in the EGR channel and between the EGR valve and the merging part; a pressure detection unit disposed in the intake channel and on the downstream side of the merging part; an EGR-valve basic opening degree calculation unit configured to calculate a basic opening degree of the EGR valve on the basis of an operation state of the internal combustion engine; an estimate-value calculation unit configured to calculate an estimate value of at least one of an air-excess ratio in a combustion chamber of the internal combustion engine or an intake oxygen concentration on the basis of detection values obtained by the first temperature detection unit, the second temperature detection unit, the third temperature detection unit, and the pressure detection unit; a target-value calculation unit configured to calculate a target value of at least one of the air-excess ratio or the intake oxygen concentration on the basis of the operation state of the internal combustion engine; a correction-factor calculation unit configured to calculate a correction factor for the basic opening degree of the EGR valve on the basis of the estimate value and the target value; an opening-degree command value calculation unit configured to calculate an opening-degree command value for the EGR valve on the basis of the basic opening degree and the correction factor; and a control unit for controlling the opening degree of the EGR valve on the basis of the opening-degree command value.

According to the present embodiment, the correction factor is calculated using at least one of the air-excess ratio having a strong correlation with the discharge amount of PM contained in exhaust gas or the intake oxygen concentration having a strong correlation with the discharge amount of NOx contained in exhaust gas, as a control parameter, to correct the basic opening degree of the EGR valve calculated on the basis of the operation state of the internal combustion engine. In particular, an estimate value of the air-excess ratio or the intake oxygen concentration used to calculate the correction factor can be obtained on the basis of detection values detected by the first to third temperature detection units and the pressure detection unit. In other words, it is no longer necessary to use an expensive airflow sensor to calculate an estimate value of the air-excess ratio or the intake oxygen concentration, unlike the conventional technique. Accordingly, it is possible to provide a control device for an internal combustion engine, at an inexpensive price, whereby it is possible to suppress a decrease in the exhaust gas performance of the internal combustion engine at low cost.

The control device for an internal combustion engine may further comprise a load detection unit configured to detect a load of the internal combustion engine, and the correction-factor calculation unit may be configured to calculate the correction factor on the basis of the estimate value and the target value of the air-excess ratio if the load detected by the load detection unit is at least a predetermined value, and to calculate the correction factor on the basis of the estimate value and the target value of the intake oxygen concentration if the load detected by the load detection unit is less than the predetermined value.

According to the present embodiment, in the high-load region, where the load of the internal combustion engine is at least the predetermined value, the discharge amount of PM contained in exhaust gas tends to increase, and thus the correction factor is calculated using the air-excess ratio related strongly to the discharge amount of PM as a control parameter, and the basic opening degree is corrected. In contrast, in the low-load region, where the load of the internal combustion engine is less than the predetermined value, the air-excess ratio is sufficiently high and the discharge amount of PM is no longer a problem, and thus the discharge amount of NOx should be reduced as a priority. Therefore, the correction factor is calculated using the intake oxygen concentration related strongly to the discharge amount of NOx as a control parameter, and the basic opening degree is corrected. That is, in accordance with the magnitude of the load of the internal combustion engine, the correction factor is calculated on the basis of either one of the air-excess ratio or the intake oxygen concentration, and the basic opening degree of the EGR valve is corrected.

The control device for an internal combustion engine may further comprise a load detection unit configured to detect a load of the internal combustion engine, and the correction-factor calculation unit may be configured to suspend calculation of the correction factor for a predetermined period if a change rate of the load detected by the load detection unit is greater than a predetermined value.

According to the present embodiment, calculation of the correction factor is suspended if the internal combustion engine is in a transient state in which the change rate of the load of the internal combustion engine is greater than a predetermined value. In the transient state, the operation of the internal combustion engine is not stable and thus the calculation accuracy of the correction factor is low. Thus, if the internal combustion engine is determined to be in the transient state, calculation of the correction factor is suspended, which makes it possible to prevent reduction of the accuracy of the opening-degree control.

Advantageous Effects

According to the present invention, the correction factor is calculated using at least one of the air-excess ratio having a strong correlation with the discharge amount of PM contained in exhaust gas or the intake oxygen concentration having a strong correlation with the discharge amount of NOx contained in exhaust gas, as a control parameter, to correct the basic opening degree of the EGR valve calculated on the basis of the operation state of the internal combustion engine. In particular, an estimate value of the air-excess ratio or the intake oxygen concentration used to calculate the correction factor can be obtained on the basis of detection values detected by the first to third temperature detection units and the pressure detection unit. In other words, it is no longer necessary to use an expensive airflow sensor to calculate an estimate value of the air-excess ratio or the intake oxygen concentration, unlike the conventional technique. Accordingly, it is possible to provide a control device for an internal combustion engine, at an inexpensive price, whereby it is possible to suppress a decrease in the exhaust gas performance of the internal combustion engine at low cost.

DETAILED DESCRIPTION

The embodiments of the present invention will now be described specifically with reference to the drawings. It is intended, however, that unless particularly specified, dimensions, materials, shapes, relative positions and the like of components described in the embodiments shall be interpreted as illustrative only and not limitative of the scope of the present invention.

Figure 1:
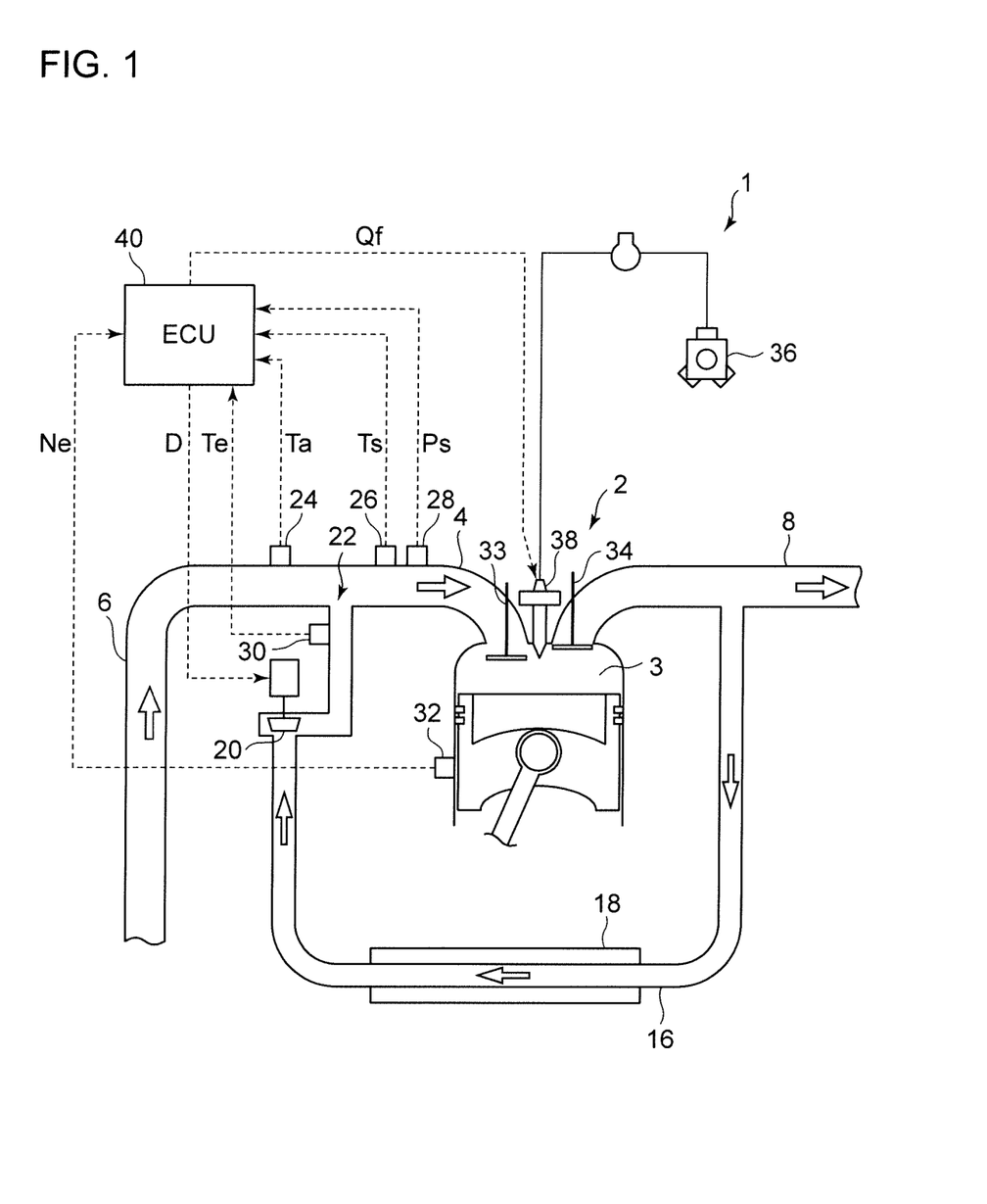
FIG. 1 is a schematic diagram of an overall configuration of a control device for an engine according to the present embodiment.

Firstly, with reference to FIG. 1, the basic configuration of a control device 1 of an internal combustion engine (engine) 2 according to the present embodiment will be described. FIG. 1 is a schematic diagram of an overall configuration of a control device of the engine 2 according to the present embodiment.

The engine 2 is a diesel engine that performs compression ignition combustion. In the engine 2, intake air is introduced into a combustion chamber 3 from an intake channel 6 via an intake manifold 4 and an intake valve 33. In the combustion chamber 3, high-pressure fuel having been pressurized by a high-pressure pump 36 is injected by a fuel injection unit 38, and thereby the compression ignition combustion is performed. Exhaust gas is produced in the combustion chamber 3 and discharged to an exhaust channel 8 via an exhaust valve 34.

An EGR channel 16 for recirculating a part of exhaust gas (EGR gas) to the intake side is connected to the exhaust channel 8. An EGR cooler 18 for cooling EGR gas and an EGR valve 20 for controlling the flow rate of EGR gas flowing through the EGR channel 16 are disposed in the EGR channel 16.

An intake-temperature sensor 24 for detecting an intake temperature Ta is disposed in the intake channel 6 and on the upstream side of a merging part 22 at which the intake channel 6 merges with the EGR channel 16. The intake-temperature sensor 24 is an example of the first temperature detection unit according to the present invention.

An cylinder inlet temperature sensor 26 for detecting an inlet temperature Ts of the combustion chamber (cylinder) 3 and a cylinder inlet pressure sensor 28 for detecting an inlet pressure Ps of the combustion chamber 3 are disposed in the intake channel 6 and on the downstream side of the merging part 22, at which the intake channel 6 merges with the EGR channel 16. The cylinder inlet temperature sensor 26 is an example of the second temperature detection unit according to the present invention, and the cylinder inlet pressure sensor 28 is an example of a pressure detection unit according to the present invention.

An EGR gas temperature sensor 30 for detecting an EGR gas temperature Te is disposed in the EGR channel 16 and between the EGR valve 20 and the merging part 22, at which the intake channel 6 merges with the EGR channel 16. The EGR gas temperature sensor 30 is an example of the third temperature detection unit according to the present invention.

It is sufficient if the EGR gas temperature sensor 30 is disposed on the downstream side of the EGR cooler 18, in the EGR channel 16.

Further, the control device 2 includes a rotation-speed sensor 32 for detecting an engine rotation speed Ne, which is an example of a parameter representing the operation state of the engine 2.

An ECU 40 is a control unit of the engine 2, and controls the fuel-injection amount, the fuel injection timing, and the opening degree of the EGR valve 20, on the basis of input signals from various sensors including the intake-temperature sensor 24, the cylinder inlet temperature sensor 26, the cylinder inlet pressure sensor 28, the EGR gas temperature sensor 30, and the rotation-speed sensor 32.

First Working Example

Figure 2:
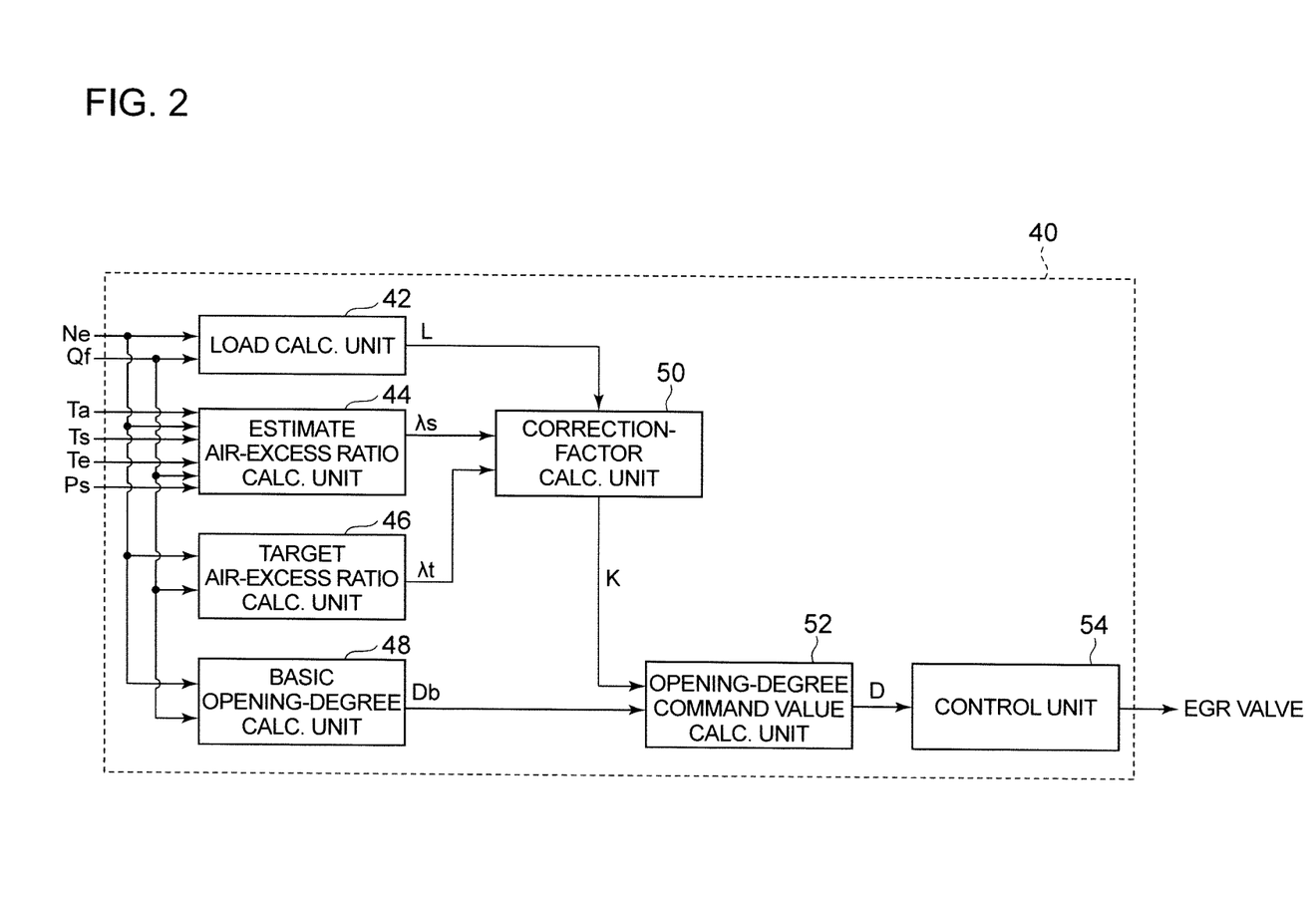
FIG. 2 is a block diagram of an interior configuration of an ECU according to the first working example.

FIG. 2 is a block diagram of an interior configuration of the ECU 40 according to the first working example.

The ECU 40 includes a load detection unit 42, an estimate air-excess ratio calculation unit 44, a target air-excess ratio calculation unit 46, an EGR-valve basic opening-degree calculation unit 48, a correction-factor calculation unit 50, an opening-degree command value calculation unit 52, and a control unit 54.

The EGR-valve basic opening-degree calculation unit 48 calculates a basic opening degree Db of the EGR valve 20 on the basis of the operation state of the engine 2. In the example of FIG. 2, the engine rotation speed Ne detected by the rotation-speed sensor 32 and the fuel-injection amount Qf serving as a command value for the fuel injection device 38 from the ECU 40 are inputted, both representing the operation state of the engine 2, and thereby the EGR-valve basic opening-degree calculation unit 48 calculates the basic opening degree of the EGR valve 20 in accordance with the inputs.

Figure 3:
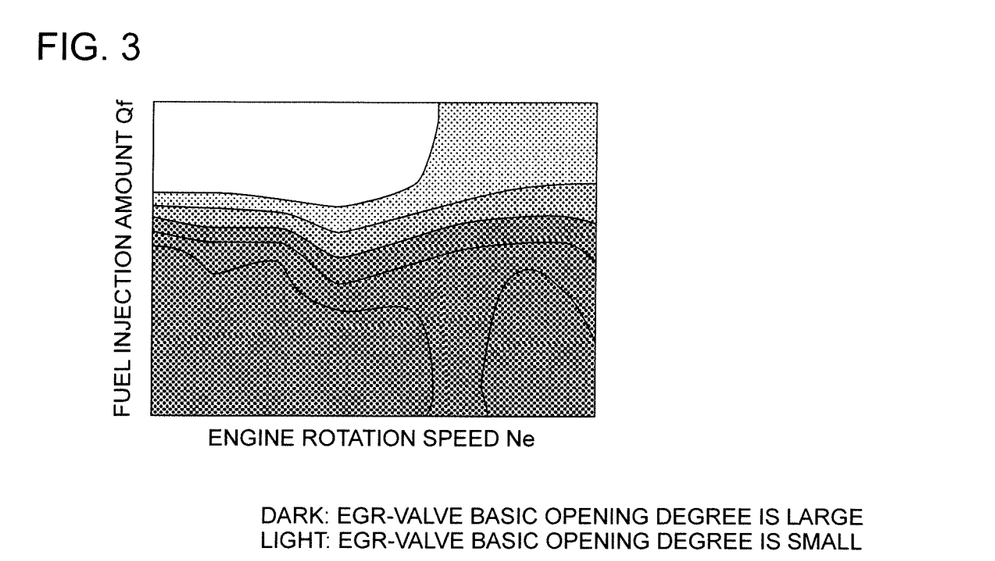
FIG. 3 is an example of a map determining a relationship of a rotation speed and a fuel-injection amount, which represent the operation state of the engine, to a basic opening degree of an EGR valve.

Specifically, the basic opening degree Db of the EGR valve 20 is calculated by referring to a map that determines a relationship between the basic opening degree Db and the operation state of the engine 2, the map being stored in advance in an unillustrated storage unit (e.g. a memory installed in the ECU 40). FIG. 3 is an example of a map determining a relationship of the rotation speed Ne and the fuel-injection amount Qf, which represent the operation state of the engine 2, to the basic opening degree Db of the EGR valve 20. This example shows the engine rotation speed Ne on x-axis and the fuel-injection amount Qf on y-axis, and determines the basic opening degree Db with respect to the corresponding combination.

It will be understood that, while the engine rotation speed Ne and the fuel-injection amount Qf are used as parameters representing the operation state of the engine 2 in the present working example, any other parameters can be used as long as they represent the operation state of the engine 2.

The estimate air-excess ratio calculation unit 44 calculates an estimate value $\lambda s$ of the air-excess ratio in the combustion chamber 3 of the internal combustion engine 2. Especially in the present embodiment, the estimate air-excess ratio $\lambda s$ is calculated on the basis of detection values obtained by the intake-temperature sensor 24, the cylinder inlet temperature sensor 26, the cylinder inlet pressure sensor 28, and the EGR gas temperature sensor 28.

Now, the method of calculating the estimate air-excess ratio $\lambda s$ with the estimate air-excess ratio calculation unit 44 will be described specifically.

Firstly, the mass flow rate Gs of cylinder intake gas (intake air sucked into the combustion chamber) is a sum of the mass flow rate Ga of fresh air sucked into the intake channel 6, the fresh air being the intake air on the upstream side of the merging part of the intake channel, and the mass flow rate Gegr of the EGR gas, which is the gas supplied to the merging part 22 from the EGR channel 16. Thus, the following equation holds.

$$Gs = Ga + Gegr \quad (1)$$

Secondly, the heat quantity of the cylinder intake gas (intake gas sucked into the combustion chamber: specific heat Cps) is a sum of the heat quantity of fresh air sucked into the intake channel 6 (the intake air on the upstream side of the merging part of the intake channel: specific heat Cpa), and the heat quantity of the EGR gas (the gas supplied to the merging part from the EGR channel: specific heat Cpe). Thus, the following equation holds, where Ta is the detection value obtained by the intake-temperature sensor 24, Ts is the detection value obtained by the cylinder inlet temperature sensor 26, and Te is the detection value obtained by the EGR gas temperature sensor 30.

$$Gs \cdot Cps \cdot Ts = Ga \cdot Cpa \cdot Ta + Gegr \cdot Cpe \cdot Te \quad (2)$$

By solving the above equations (1) and (2) as a set of simultaneous equations, the mass flow rate Ga of fresh air sucked into the intake channel 6, the fresh air being the intake air on the upstream side of the merging part 22 of the intake channel 6, and the mass flow rate Gegr of the EGR gas, which is the gas supplied to the merging part 22 from the EGR channel 16, can be obtained from the following equations.

$$Ga = Gs(Cpe \cdot Te - Cps \cdot Ts)/(Cpe \cdot Te - Cpa \cdot Ta) \quad (3)$$

$$Gegr = Gs(Cps \cdot Ts - Cpa \cdot Ta)/(Cpe \cdot Te - Cpa \cdot Ta) \qquad (4)$$

Further, the mass flow rate Gs of the cylinder intake gas (intake air sucked into the combustion chamber) can be obtained from the following equation, where Vst is the stroke volume per one cylinder of the engine 2, Ncyl is the number of cylinders, Ne is the engine rotation speed, Ps is the cylinder input pressure, Ts is the cylinder inlet temperature, Ra is the gas constant, and rev is the volume efficiency.

$$Gs = Vst \cdot Ncyl \cdot Ne/(2 \cdot 60) \cdot Ps/(Ra \cdot Ts) \cdot \eta v \qquad (5)$$

Typically, as the volume efficiency $\eta v$, a value given by a map in accordance with the engine rotation speed Ne and the fuel-injection amount Qf may be used. Further, the number "2" in the equation (5) indicates that the engine 2 used in the present working example is a four-stroke engine, and this number may be replaced with another suitable number depending on the specification of the engine (e.g. if the engine 2 is a two-stroke engine, the number is "1").

The air mass flow rate Gegra contained in the EGR gas can be obtained by applying the equations (3) to (5) to the following equation.

$$Gegra = (Gegr(\lambda_{n-1} - 1) \cdot Gf \cdot Lth)/(Ga + Gf + Gegr) \qquad (6)$$

In the above equation, $\lambda_{n-1}$ is a previously-calculated value of the estimate air-excess ratio $\lambda s$, Gf is the fuel-injection amount (command value issued by the ECU), and Lth is a theoretical air-fuel ratio. Then, using the air mass flow rate Gegra obtained from the equation (6), the estimate air-excess ratio $\lambda s$ can be obtained from the following equation.

$$\lambda s = (Ga + Gegra)/(Gf \cdot Lth) \qquad (7)$$

As described above, the estimate air-excess ratio calculation unit 44 is capable of calculating the estimate air-excess ratio $\lambda s$ on the basis of detection values obtained by the intake-temperature sensor 24, the cylinder inlet temperature sensor 26, the EGR gas temperature sensor 30, and the cylinder inlet pressure sensor 28. In a conventional case, to calculate the air-excess ratio, the mass flow rate Ga of fresh air sucked into the intake channel 6, the fresh air being the intake air on the upstream side of the merging part 22 of the intake channel 6, is detected by an expensive airflow sensor disposed in the intake channel 6, which is disadvantageous in terms of the cost. In contrast, in the present working example, it is possible to calculate an estimate value of the air-excess ratio without using an expensive airflow sensor, unlike the above described conventional case. Thus, the present embodiment is advantageous in terms of cost.

Next, the target air-excess ratio calculation unit 46 calculates the target value $\lambda t$ of the air-excess ratio on the basis of the operation state of the engine 2. In the example of FIG. 2, the engine rotation speed Ne detected by the rotation-speed sensor and the fuel-injection amount Qf serving as a command value for the fuel injection device 38 from the ECU 40 are inputted, both representing the operation state of the engine 2, and thereby the target air-excess ratio calculation unit 46 calculates the target air-excess ratio $\lambda t$ corresponding to the inputs.

Figure 4:
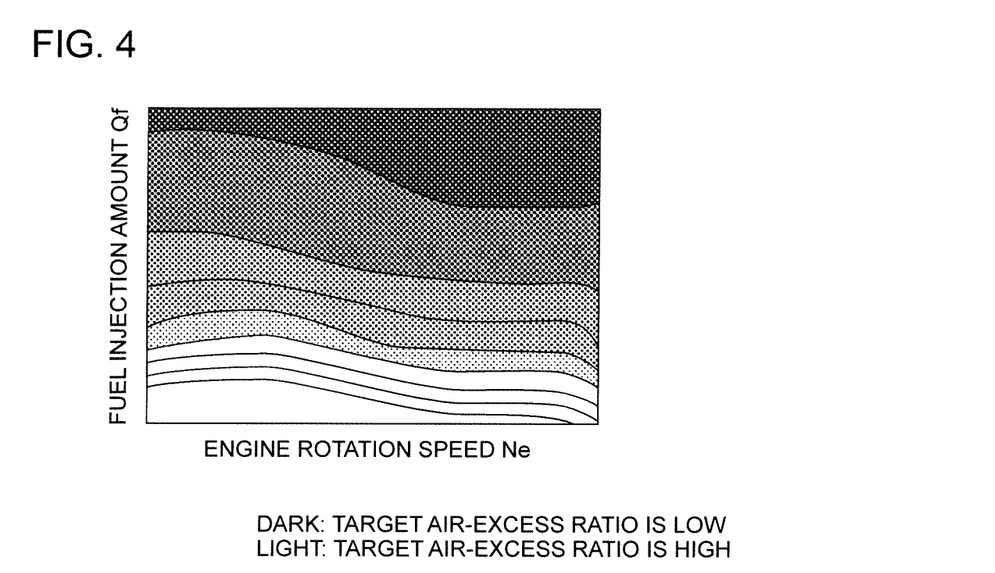
FIG. 4 is an example of a map determining a relationship of a rotation speed and a fuel-injection amount, which represent the operation state of the engine, to a target air-excess ratio.

Specifically, the target air-excess ratio $\lambda t$ is calculated by referring to a map that determines a relationship between the target air-excess ratio $\lambda t$ and the operation state of the engine 2, the map being stored in advance in an unillustrated storage unit. FIG. 4 is an example of a map determining a relationship of the rotation speed Ne and the fuel-injection amount Qf, which represent the operation state of the engine 2, to the target air-excess ratio $\lambda t$. This example shows the engine rotation speed Ne on x-axis and the fuel-injection amount Qf on y-axis, and determines the target air-excess ratio $\lambda t$ with respect to the corresponding combination.

The correction-factor calculation unit 50 calculates a correction factor K for the basic opening degree Db of the EGR valve 20, on the basis of the estimate air-excess ratio $\lambda s$ calculated by the estimate air-excess ratio calculation unit 44 and the target air-excess ratio $\lambda t$ calculated by the target air-excess ratio calculation unit 46.

The correction factor K is increased or decreased on the basis of a result of comparing the estimate air-excess ratio $\lambda s$ with the target air-excess ratio $\lambda t$, and a feedback control is performed so that the estimate air-excess ratio $\lambda s$ matches the target air-excess ratio $\lambda t$.

The load detection unit 42 detects the load L of the engine 2 on the basis of the engine rotation speed Ne and the fuel-injection amount Qf. The detected load L is sent to the correction-factor calculation unit 50, and calculation of the correction factor K is suspended in accordance with the value of the load L, as described below with reference to FIG. 7.

The opening-degree command value calculation unit 52 calculates the opening-degree command value D for the EGR valve 20 by multiplying the basic opening degree Db calculated by the basic opening-degree calculation unit 48 by the correction factor K calculated by the correction-factor calculation unit 50, as expressed in the following equation.

$$D = Db \times K \qquad (8)$$

The control unit 54 sends a control signal to the EGR valve on the basis of the opening-degree command value D calculated by the opening-degree command value calculation unit 52 to control the opening degree.

As described above, in the first working example, the opening degree of the EGR valve 20 is controlled using the opening-degree command value D obtained by correcting the basic opening degree Db of the EGR valve 20 with the correction factor K calculated on the basis of the estimate value $\lambda s$ and the target value $\lambda t$ of the air-excess ratio. The above opening-degree control of the EGR valve 20 based on the air-excess ratio can suppress the discharge amount of PM contained in exhaust gas of the engine 2 more effectively than the conventional opening-degree control based on the EGR rate.

Figure 5A:
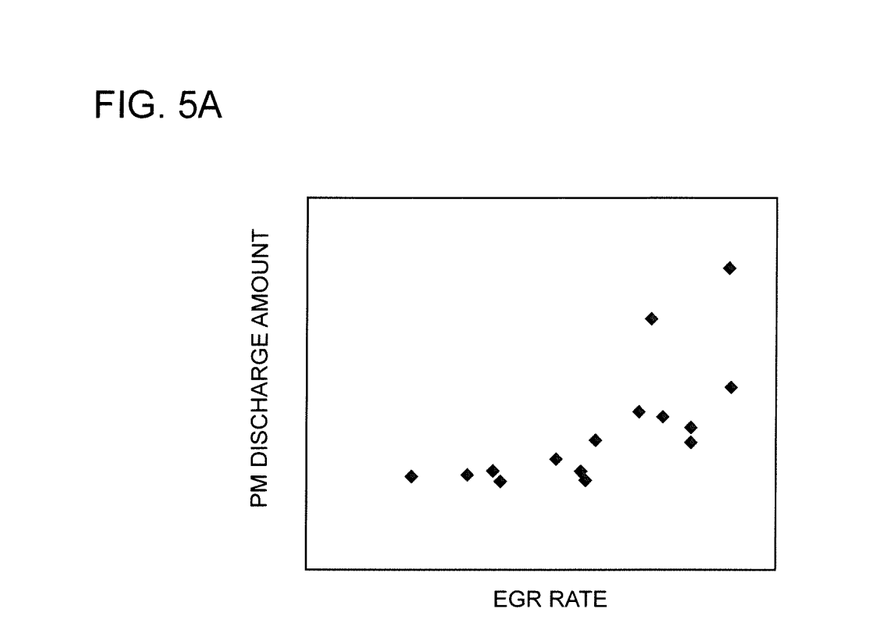
FIGS. 5A and 5B illustrate test results showing a correlation of a discharge amount of PM contained in exhaust gas to the air-excess ratio and the EGR rate, respectively.
Figure 5B:
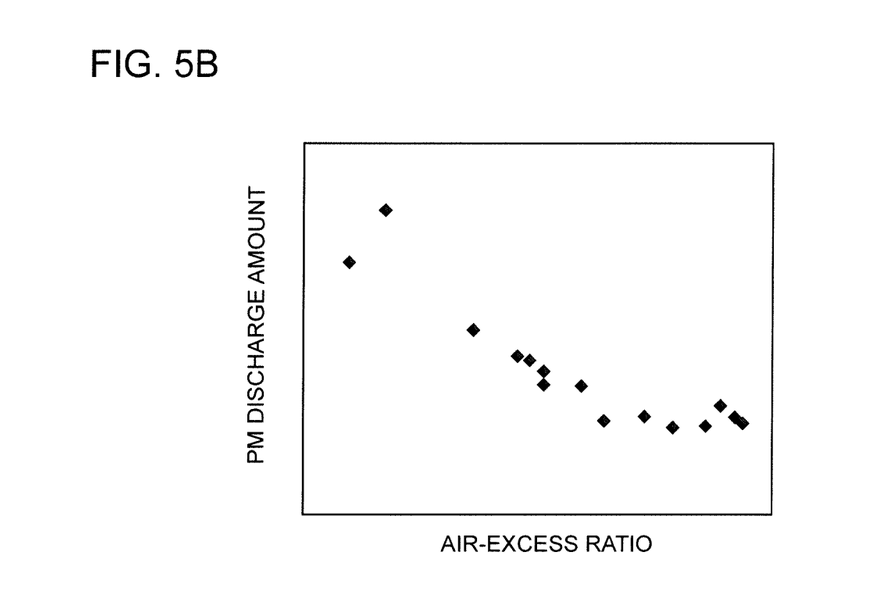

FIGS. 5A and 5B show test results showing a correlation of a discharge amount of PM contained in exhaust gas to the air-excess ratio and the EGR rate. FIG. 5A shows data representing a correlation between the EGR rate and the discharge amount of PM, and FIG. 5B shows data representing a correlation between the air-excess ratio and the discharge amount of PM. According to the drawings, the discharge amount of PM has a stronger relationship with the air-excess ratio than with the EGR rate.

Thus, in the present embodiment, the correction factor K is obtained using the air-excess ratio $\lambda$, which has a stronger correlation with the discharge amount of PM contained in exhaust gas, as a control parameter, to correct the basic opening degree Db of the EGR valve 20 calculated on the basis of the operation state of the engine 2. In this way, it is possible to perform an opening-degree control of the EGR valve that can suppress an increase in the discharge amount of PM contained in exhaust gas.

Figure 6A:
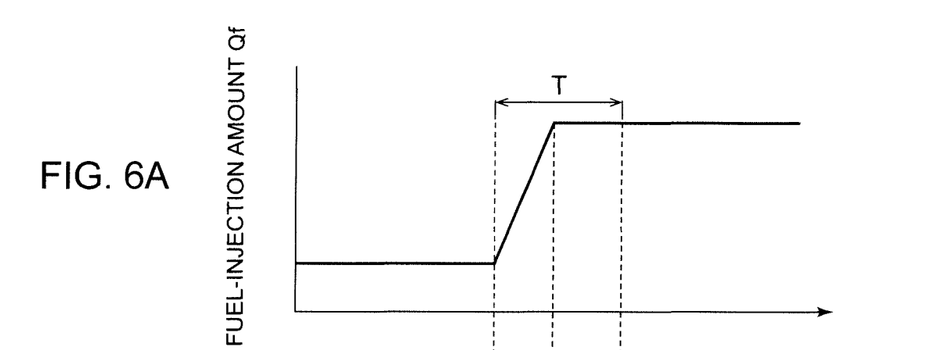
FIGS. 6A to 6C are time charts showing, respectively, time-series changes of: a fuel-injection amount; an estimate air-excess ratio and a target air-excess ratio; and a correction factor, in response to occurrence of a transient state of the engine.
Figure 6B:
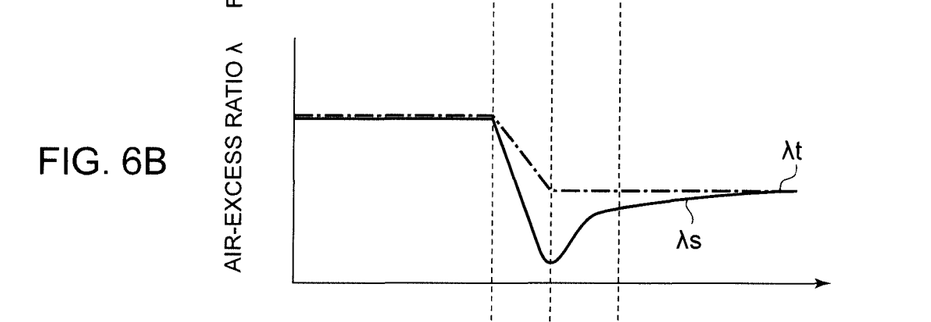
Figure 6C:
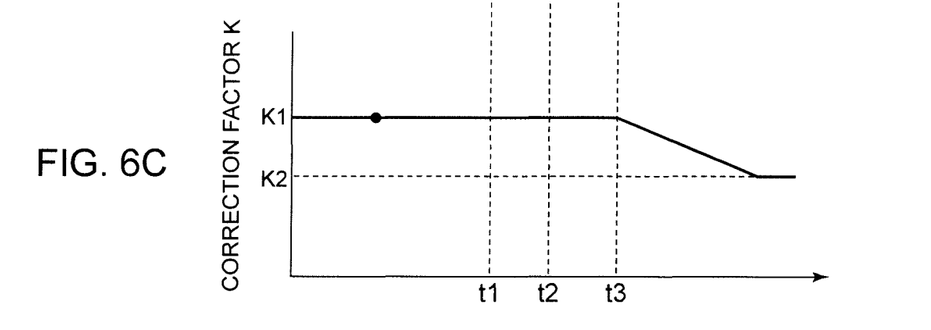

FIGS. 6A to 6C are time charts showing time-series changes in, respectively: the fuel-injection amount Qf; the estimate air-excess ratio $\lambda s$ and the target air-excess ratio $\lambda t$; and the correction factor K, the changes being responsive to occurrence of a transient state of the engine 2. FIGS. 6A to 6C illustrate a situation in which, in an engine operating in a normal state, the load changes at timing t1 and a transitional change is occurring.

As shown in FIG. 6A, the fuel-injection amount Qf increases from timing t1 to t2 in accordance with the changing timing of the load of the engine. In accordance with such a change in the fuel-injection amount Qf, the target air-excess ratio λt calculated on the basis of the fuel-injection amount Qf also changes as illustrated in FIG. 6B. In other words, as described above with reference to FIG. 4, the target air-excess ratio λt is calculated on the basis of the map drawn with the fuel-injection amount Qf being a variable, and thus changes in accordance with the manner of change of the fuel-injection amount Qf. In contrast, the estimate air-excess ratio λs corresponds to the actual measurement value of the air-excess ratio in the combustion chamber 3, and the intake air cannot be increased sufficiently in accordance with an increase in the fuel-injection amount in the event of a rapid load increase, thus resulting in a transient and considerable decrease in the estimate air-excess ratio λs. However, the temperature sensor for calculating the estimate air-excess ratio λs normally has a low measurement-responsiveness to the actual temperature, and thus the estimate accuracy of the estimate air-excess ratio λs is low in a transient state. In view of this, as illustrated in FIG. 6C, for a predetermined period T after the start timing t1 of the transient state, the correction factor K is not increased or decreased but fixed to the correction factor K at the time of t1, even if there is a gap between the estimate air-excess ratio λs and the target air-excess ratio 2a. In this way, it is possible to avoid an improper control due to a reduced estimate accuracy of the estimate air-excess ratio λs, and to avoid a decrease in the performance of the engine 2.

It should be noted that, while the engine 2 may be used as a power source of a moving body such as a vehicle, the engine 2 may be preferably used as an engine to be operated at a rated output, such as a fixed engine for power generation. The output is substantially constant in such a rated-output engine, and thus the transient state does not take place except for the start timing and the stop timing of the operation of the engine. Thus, the suspension of the calculation of the correction factor K, as illustrated in FIG. 6C, occurs only seldom, which makes it possible to control the opening of the EGR valve accurately.

As described above, according to the first working example, the correction factor K is obtained using the air-excess ratio, which has a stronger correlation with the discharge amount of PM contained in exhaust gas, as a control parameter, to correct the basic opening degree of the EGR valve 20 calculated on the basis of the operation state of the engine 2. In this way, it is possible to control the opening degree of the EGR valve 20 and to suppress an increase in the discharge amount of PM contained in exhaust gas effectively.

Second Working Example

Figure 7:
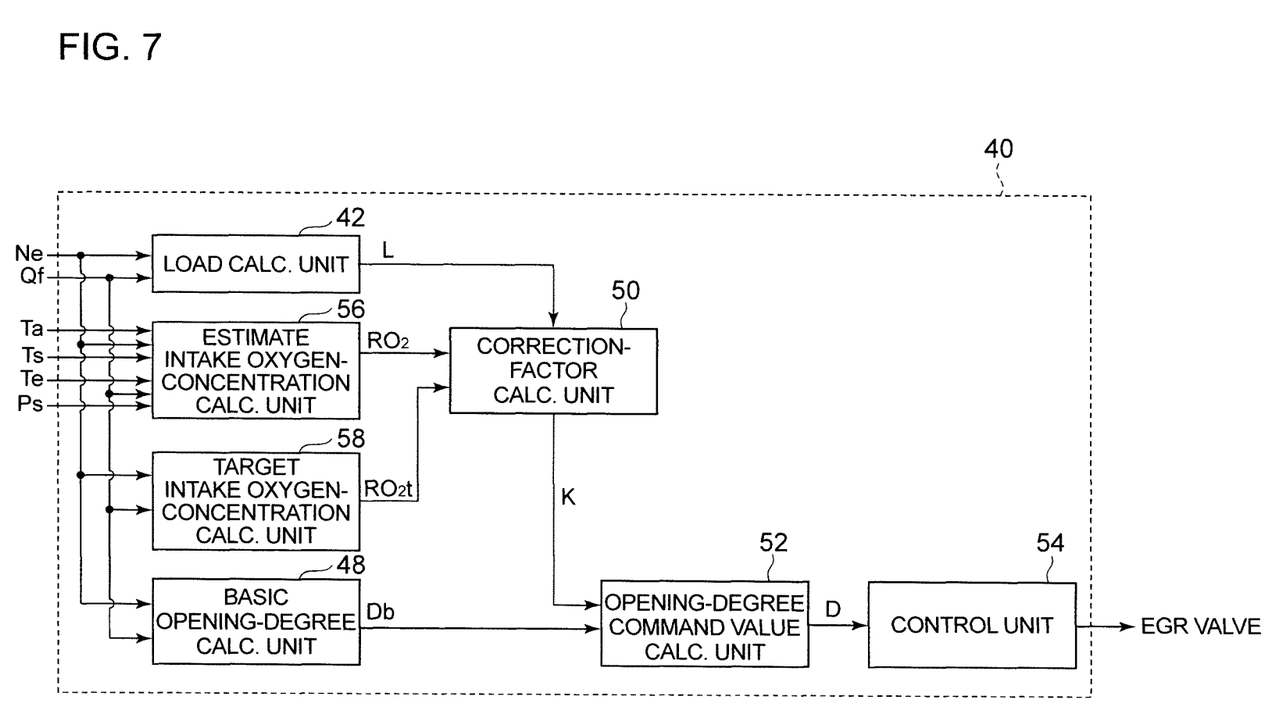
FIG. 7 is a block diagram of an interior configuration of an ECU according to the second working example.

FIG. 7 is a block diagram of an interior configuration of the ECU 40 according to the second working example.

The ECU 40 includes a load detection unit 42, an estimate intake oxygen-concentration calculation unit 56, a target intake oxygen-concentration calculation unit 58, a correction-factor calculation unit 50, an EGR-valve basic opening-degree calculation unit 48, an opening-degree command value calculation unit 52, and a control unit 54. In the following description, the same features in the above first embodiment are associated with the same reference numerals, and not described again for convenience.

The estimate intake oxygen-concentration calculation unit 56 calculates an estimate value $RO_2$ of the concentration of oxygen contained in the intake air supplied to the combustion chamber 3 of the engine 2. In the present working example in particular, the estimate intake oxygen concentration $RO_2$ is calculated on the basis of the estimate air-excess ratio λs calculated on the basis of detection values obtained by the intake-temperature sensor 24, the cylinder inlet temperature sensor 26, the EGR gas temperature sensor 30, and the cylinder inlet pressure sensor 28.

Now, the method of calculating the estimate intake oxygen concentration $RO_2$ with the estimate intake oxygen-concentration calculation unit 56 will be described specifically.

First, the mass flow rate $GO_2$ of oxygen contained in the cylinder intake air can be obtained from the following equation.

$$GO_2 = \lambda s \cdot Gf \cdot Lth \times 0.23 \quad (9)$$

In the equation (9), "0.23" is the mass ratio of the oxygen in the air.

Further, the estimate intake oxygen concentration $RO_2$ can be obtained from the following equation, using the cylinder intake oxygen mass flow rate $GO_2$ and the equations (3) and (4). In the following equation, $\rho O_2$, $\rho a$, and $\rho egr$ are the densities of oxygen, air, and EGR gas, respectively.

$$RO_2 = (GO_2/\rho O_2)/(Ga/\rho a + Gegr/\rho egr) \quad (10)$$

As described above, the estimate intake oxygen-concentration calculation unit 56 can calculate the estimate value of the intake oxygen concentration $RO_2$ used to calculate the correction factor K, using the air-excess ratio λs calculated on the basis of detection values obtained by the intake-temperature sensor 24, the cylinder inlet temperature sensor 26, the EGR gas temperature sensor 30, and the cylinder inlet pressure sensor 28. In other words, it is no longer necessary to use an expensive airflow sensor to calculate the intake oxygen concentration, unlike the conventional technique, which makes it possible to reduce the cost.

Next, the target intake oxygen-concentration calculation unit 58 calculates the target value $RO_2t$ of the intake oxygen concentration on the basis of the operation state of the engine 2. In the example of FIG. 7, the engine rotation speed Ne detected by the rotation-speed sensor and the fuel-injection amount Qf serving as a command value for the fuel injection device 38 from the ECU 40 are inputted, both representing the operation state of the engine 2, and thereby the target intake oxygen-concentration calculation unit 58 calculates the target intake oxygen concentration $RO_2t$ in accordance with the inputs.

Figure 8:
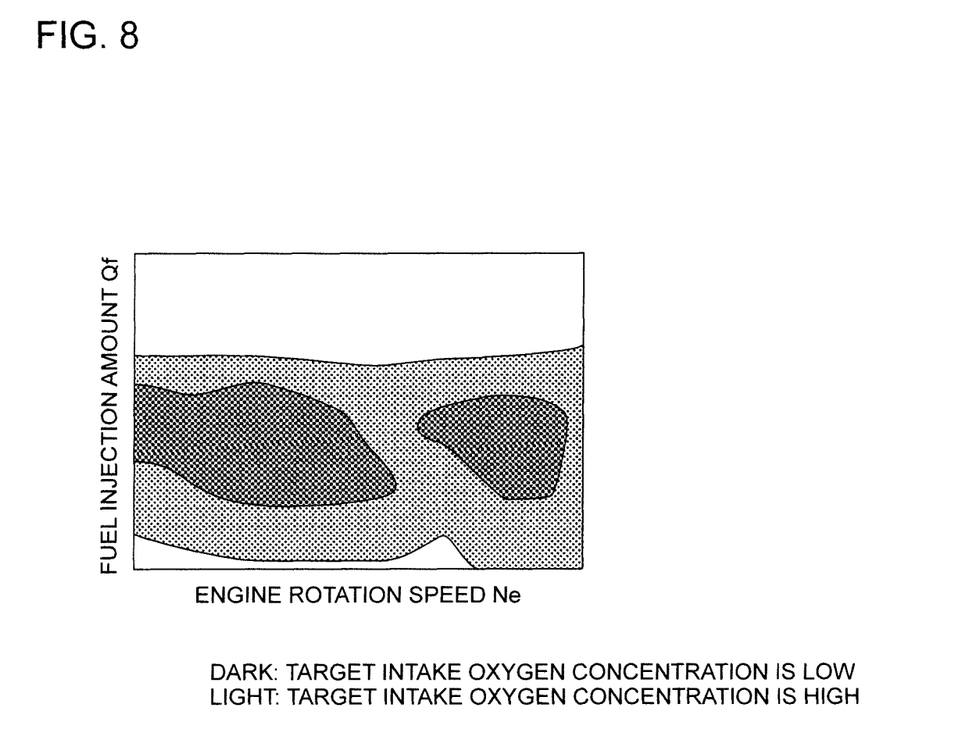
FIG. 8 is an example of a map determining a relationship of a rotation speed and a fuel-injection amount, which represent the operation state of the engine, to a target intake oxygen concentration.
Figure 9A:
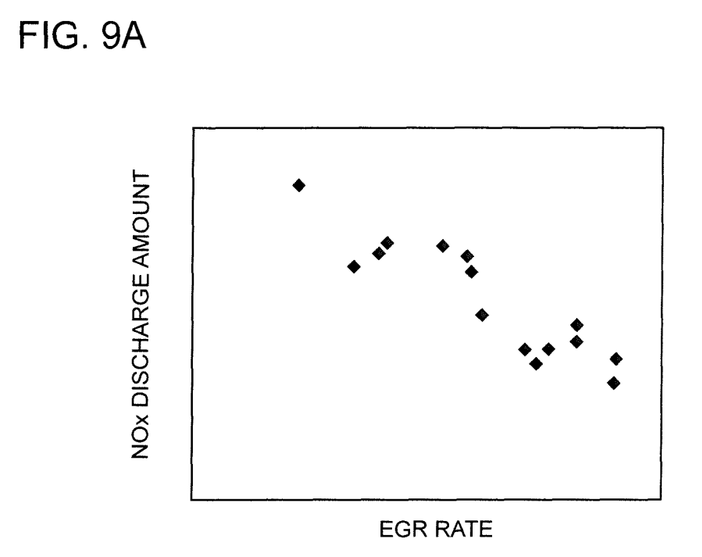
FIGS. 9A and 9B are graphs showing a correlation of a NOx discharge amount to, respectively, an EGR rate and an intake oxygen concentration.
Figure 9B:
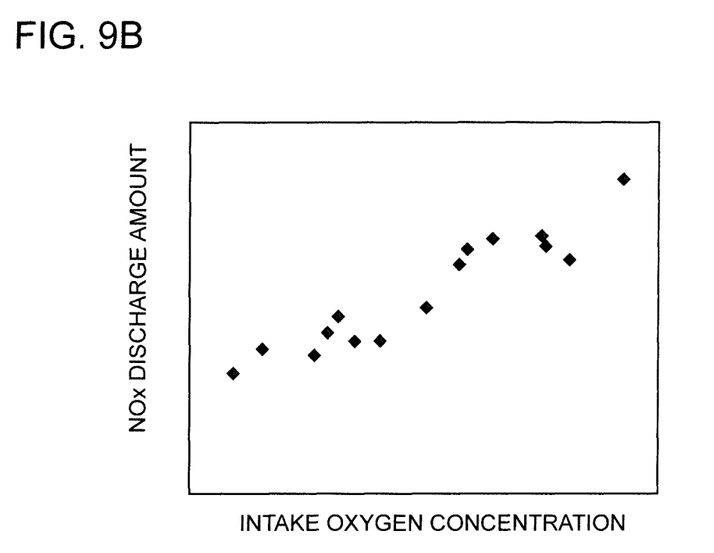

Specifically, the target intake oxygen concentration $RO_2t$ is calculated by referring to a map that determines a relationship between the target intake oxygen concentration $RO_2t$ and the operation state of the engine 2, the map being stored in advance in an unillustrated storage unit. FIG. 8 is an example of a map determining a relationship of the rotation speed Ne and the fuel-injection amount Qf, which represent the operation state of the engine, to the target intake oxygen concentration $RO_2t$. This example shows the engine rotation speed Ne on x-axis and the fuel-injection amount Qf on y-axis, and determines the target intake oxygen concentration $RO_2t$ with respect to the corresponding combination.

The correction-factor calculation unit 50 calculates a correction factor K for the basic opening degree Db of the EGR valve 20, on the basis of the estimate intake oxygen concentration $RO_2s$ calculated by the estimate intake oxygen-concentration calculation unit 56 and the target intake oxygen concentration $RO_2t$ calculated by the target intake oxygen-concentration calculation unit 58.

The correction factor K is increased or decreased on the basis of a comparison result between the estimate intake oxygen concentration $RO_2$ and the target intake oxygen concentration $RO_2t$, and a feedback control is performed so that the estimate intake oxygen concentration $RO_2$ matches the target intake oxygen concentration $RO_2t$.

The correction factor K calculated as described above is used by the opening-degree command value calculation unit 52 to calculate the opening-degree command value D for the EGR valve 20 on the basis of the equation (8), similarly to the first working example, and the opening-degree command value D is sent as a control signal for the EGR valve 20 to perform the opening-degree control.

As described above, according to the second working example, the correction factor is calculated using the intake oxygen concentration, which has a strong correlation with the discharge amount of NOx contained in exhaust gas, as a control parameter, to correct the basic opening degree of the EGR valve 20 calculated on the basis of the operation state of the engine 2. In this way, it is possible to control the opening degree of the EGR valve 20 and to suppress an increase in the discharge amount of NOx contained in exhaust gas effectively.

Third Working Example

Figure 10:
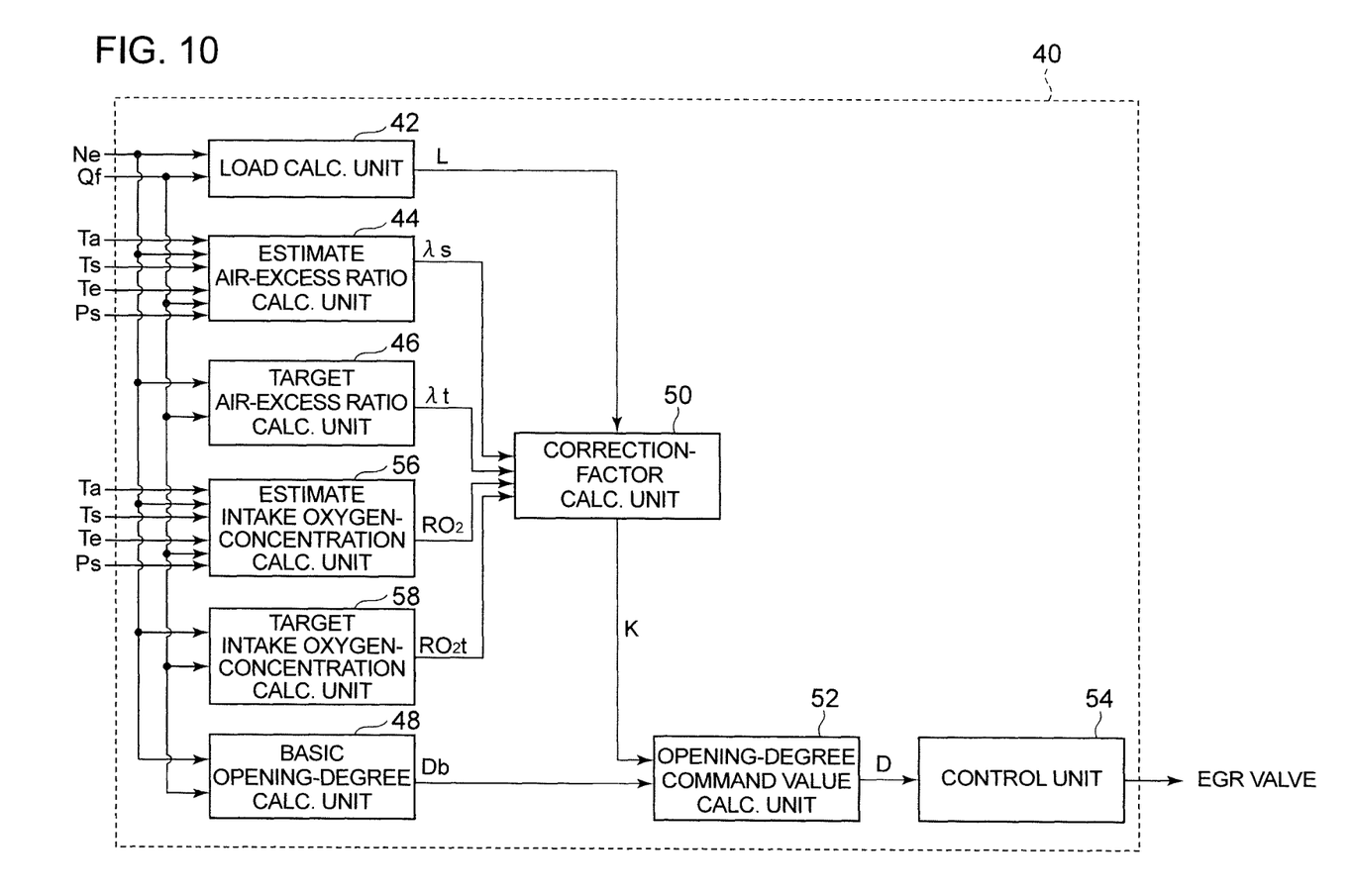
FIG. 10 is a block diagram of an interior configuration of an ECU according to the third embodiment.

FIG. 10 is a block diagram of an interior configuration of the ECU 40 according to the third working example.

The ECU 40 includes the load detection unit 42, the estimate air-excess ratio calculation unit 44, the target air-excess ratio calculation unit 46, the estimate intake oxygen-concentration calculation unit 56, the target intake oxygen-concentration calculation unit 58, the EGR-valve basic opening-degree calculation unit 48, the correction-factor calculation unit 50, the opening-degree command value calculation unit 52, and the control unit 54.

In the following description, the same features in the above first and second working examples are associated with the same reference numerals, and not described again where appropriate. Specifically, the third working example includes features of both of the first and second working examples, which are selectively used in accordance with the operation state of the engine.

Figure 11:
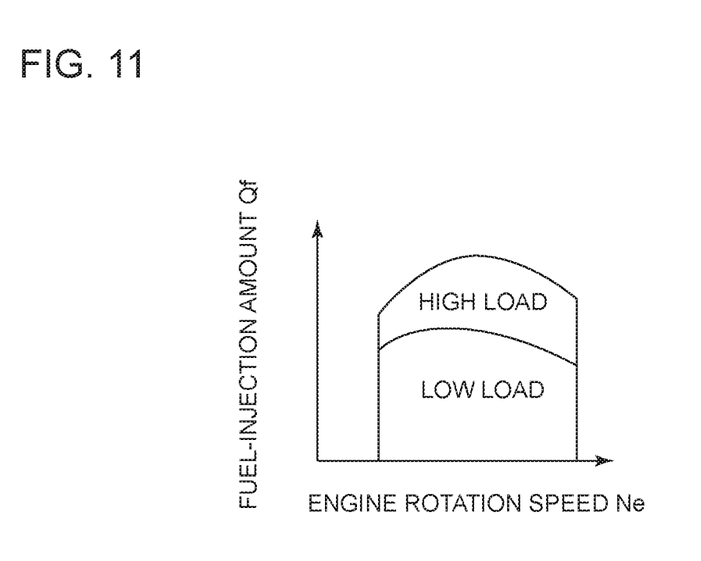
FIG. 11 is a conceptual diagram of a load distribution in an operation state determined on the basis of an engine rotation speed and a fuel-injection amount.

The load detection unit 42 detects the load of the engine on the basis of the fuel-injection amount Qf (command value), and determines whether the load L is in a high-load region. FIG. 11 is a conceptual diagram of a load distribution in an operation state determined on the basis of the engine rotation speed and the fuel-injection amount.

In FIG. 11, a low-load region and a high-load region are defined across a predetermined threshold value. The threshold value may be set as a variable based on engine control parameters such as the engine rotation speed and the fuel-injection amount, as illustrated in FIG. 11, or may be fixed to a constant value.

In the third working example, it is possible to calculate the correction factor K on the basis of the air-excess ratio, which is strongly related to the discharge amount of PM contained in exhaust gas, with the estimate air-excess ratio calculation unit 44 and the target air-excess ratio calculation unit 46 provided as in the first working example, as well as to calculate the correction factor K on the basis of the intake oxygen concentration, which is strongly related to the discharge amount of NOx contained in exhaust gas, with the estimate intake oxygen-concentration calculation unit 56 and the target intake oxygen-concentration calculation unit 58 provided as in the second working example.

Further, the ECU 40 is configured to be capable of switching a calculation mode between calculation of the correction factor K based on the air-excess ratio as in the first embodiment and calculation of the correction factor K based on the intake oxygen concentration as in the second embodiment, on the basis of whether the load L detected by the load detection unit 42 is at least a predetermined value L1 (i.e. whether the operation state of the engine 2 is in the high-load region or the low-load region illustrated in FIG. 11).

According to the researches conducted by the present inventors, the discharge amount of PM contained in exhaust gas tends to increase with an increase in the load L of the engine 2. Thus, in the high-load region, where the load of the engine 2 is at least the predetermined value L1, the correction factor K is calculated using the air-excess ratio greatly related to the discharge amount of PM as a control parameter, and the basic opening degree is corrected.

In contrast, as the load of the engine 2 decreases, the air-excess ratio increases and the discharge amount of PM is no longer a problem. Thus, it is desirable to reduce the discharge amount of NOx as a priority. Thus, in the low-load region, where the load of the engine 2 is less than the predetermined value L1, the correction factor K is calculated using the intake oxygen concentration, which has a strong relationship with the discharge amount of NOx, as a control parameter, and the basic opening degree is corrected.

As described above, according to the third working example, in the high-load region, where the load L of the engine 2 is at least the predetermined value L1, the discharge amount of PM contained in exhaust gas tends to increase, and thus the correction factor K is calculated using the air-excess ratio, which has a strong relationship with the discharge amount of PM, as a control parameter, and the basic opening degree Db is corrected. In contrast, in the low-load region, where the load L of the engine 2 is less than the predetermined value L1, the air-excess ratio is sufficiently high and the discharge amount of PM is no longer a problem, and thus the discharge amount of NOx should be reduced as a priority. Therefore, the correction factor K is calculated using the intake oxygen concentration, which has a strong relationship with the discharge amount of NOx, as a control parameter, and the basic opening degree Db is corrected. That is, in accordance with the magnitude of the load L of the engine 2, the correction factor K is calculated on the basis of either one of the air-excess ratio or the intake oxygen concentration, and the basic opening degree Db of the EGR valve 20 is corrected. In this way, it is possible to control the opening degree suitably in accordance with the operation state of the internal combustion engine.

INDUSTRIAL APPLICABILITY

The present invention can be used for a control device for an internal combustion engine including an exhaust-gas recirculation device (EGR) for recirculating a part of exhaust gas to an intake channel.

DESCRIPTION OF REFERENCE NUMERAL

1 Control device
2 Engine

3 Combustion chamber
4 Intake manifold
6 Intake channel
8 Exhaust channel
16 EGR channel
18 EGR cooler
20 EGR valve
22 Merging part
24 Intake-temperature sensor
26 Cylinder inlet temperature sensor
28 Cylinder inlet pressure sensor
30 EGR gas temperature sensor
32 Engine rotation-speed sensor
33 Intake valve
34 Exhaust valve
36 High-pressure pump
38 Fuel injection unit
40 ECU
42 Load detection unit
44 Estimate air-excess ratio calculation unit
46 Target air-excess ratio calculation unit
48 EGR valve basic opening-degree calculation unit
50 Correction-factor calculation unit
52 Opening-degree command value calculation unit
54 Control unit
56 Estimate intake oxygen-concentration calculation unit
58 Target intake oxygen-concentration calculation unit

The invention claimed is:

1. A control device for an internal combustion engine with an EGR device which recirculates a part of exhaust gas of the internal combustion engine to an intake channel via an exhaust gas recirculation (EGR) channel, the internal combustion engine being programmed to control an EGR amount by adjusting an opening degree of an EGR valve disposed in the EGR channel, the control device comprising:
a first temperature detection unit disposed in the intake channel and on an upstream side of a merging part at which the intake channel merges with the EGR channel;
a second temperature detection unit disposed in the intake channel and on a downstream side of the merging part;
a third temperature detection unit disposed in the EGR channel and between the EGR valve and the merging part;
a pressure detection unit disposed in the intake channel and on the downstream side of the merging part;
an EGR-valve basic opening degree calculation unit programmed to calculate a basic opening degree of the EGR valve on the basis of an operation state of the internal combustion engine;
an estimate-value calculation unit programmed to calculate an estimate value of an air-excess ratio in a combustion chamber of the internal combustion engine on the basis of a fuel-injection amount of the internal combustion engine, a rotation speed of the internal combustion engine, and detection values obtained by the first temperature detection unit, the second temperature detection unit, the third temperature detection unit, and the pressure detection unit;
a target-value calculation unit programmed to calculate a target value of the air-excess ratio on the basis of the operation state of the internal combustion engine;
a correction-factor calculation unit programmed to calculate a correction factor for the basic opening degree of the EGR valve on the basis of the estimate value and the target value;
an opening-degree command value calculation unit programmed to calculate an opening-degree command value for the EGR valve on the basis of the basic opening degree and the correction factor;
a control unit programmed to control the opening degree of the EGR valve on the basis of the opening-degree command value; and
a load detection unit programmed to detect a load of the internal combustion engine,
wherein the correction-factor calculation unit is programmed to calculate the correction factor on the basis of the estimate value and the target value of the air-excess ratio if the load detected by the load detection unit is equal or larger than a predetermined value.

2. A control device for an internal combustion engine with an EGR device which recirculates a part of exhaust gas of the internal combustion engine to an intake channel via an exhaust gas recirculation (EGR) channel, the internal combustion engine being programmed to control an EGR amount by adjusting an opening degree of an EGR valve disposed in the EGR channel, the control device comprising:
a first temperature detection unit disposed in the intake channel and on an upstream side of a merging part at which the intake channel merges with the EGR channel;
a second temperature detection unit disposed in the intake channel and on a downstream side of the merging part;
a third temperature detection unit disposed in the EGR channel and between the EGR valve and the merging part;
a pressure detection unit disposed in the intake channel and on the downstream side of the merging part;
an EGR-valve basic opening degree calculation unit programmed to calculate a basic opening degree of the EGR valve on the basis of an operation state of the internal combustion engine;
an estimate-value calculation unit programmed to calculate a first estimate value of an air-excess ratio in a combustion chamber of the internal combustion engine and a second estimate value of an intake oxygen concentration on the basis of a fuel-injection amount of the internal combustion engine, a rotation speed of the internal combustion engine, and detection values obtained by the first temperature detection unit, the second temperature detection unit, the third temperature detection unit, and the pressure detection unit;
a target-value calculation unit programmed to calculate a first target value of the air-excess ratio and a second target value of the intake oxygen concentration on the basis of the operation state of the internal combustion engine;
a correction-factor calculation unit programmed to calculate a correction factor for the basic opening degree of the EGR valve on the basis of the first estimate value, the second estimate value, the first target value and the second target value;
an opening-degree command value calculation unit programmed to calculate an opening-degree command value for the EGR valve on the basis of the basic opening degree and the correction factor;
a control unit programmed to control the opening degree of the EGR valve on the basis of the opening-degree command value; and
a load detection unit programmed to detect a load of the internal combustion engine,
wherein the correction-factor calculation unit is programmed to calculate the correction factor on the basis of the first estimate value and the first target value of the air-excess ratio if the load detected by the load detection unit is at least a predetermined value, and to calculate the correction factor on the basis of the second estimate value and the second target value of the intake oxygen concentration if the load detected by the load detection unit is less than the predetermined value.

3. A control device for an internal combustion engine with an EGR device which recirculates a part of exhaust gas of the internal combustion engine to an intake channel via an exhaust gas recirculation (EGR) channel, the internal combustion engine being programmed to control an EGR amount by adjusting of an opening degree of an EGR valve disposed in the EGR channel, the control device comprising:
   a first temperature detection unit disposed in the intake channel and on an upstream side of a merging part at which the intake channel merges with the EGR channel;
   a second temperature detection unit disposed in the intake channel and on a downstream side of the merging part;
   a third temperature detection unit disposed in the EGR channel and between the EGR valve and the merging part;
   a pressure detection unit disposed in the intake channel and on the downstream side of the merging part;
   an EGR-valve basic opening degree calculation unit programmed to calculate a basic opening degree of the EGR valve on the basis of an operation state of the internal combustion engine;
   an estimate-value calculation unit programmed to calculate an estimate value an intake oxygen concentration on the basis of a fuel-injection amount of the internal combustion engine, a rotation speed of the internal combustion engine, and detection values obtained by the first temperature detection unit, the second temperature detection unit, the third temperature detection unit, and the pressure detection unit;
   a target-value calculation unit programmed to calculate a target value of the intake oxygen concentration on the basis of the operation state of the internal combustion engine;
   a correction-factor calculation unit programmed to calculate a correction factor for the basic opening degree of the EGR valve on the basis of the estimate value and the target value;
   an opening-degree command value calculation unit programmed to calculate an opening-degree command value for the EGR valve on the basis of the basic opening degree and the correction factor;
   a control unit programmed to control the opening degree of the EGR valve on the basis of the opening-degree command value; and
   a load detection unit programmed to detect a load of the internal combustion engine,
   wherein the correction-factor calculation unit is programmed to suspend calculation of the correction factor for a predetermined period if a change rate of the load detected by the load detection unit is greater than a predetermined value.

4. The control device for an internal combustion engine according to claim 3, wherein the opening-degree command value calculation unit calculates an opening-degree command value on the basis of the correction factor obtained at a last time during the predetermined period.

5. The control device for an internal combustion engine according to claim 3,
   wherein internal combustion engine is a fixed engine for power generation.

* * * * *